United States Patent Office 3,002,552
Patented Oct. 3, 1961

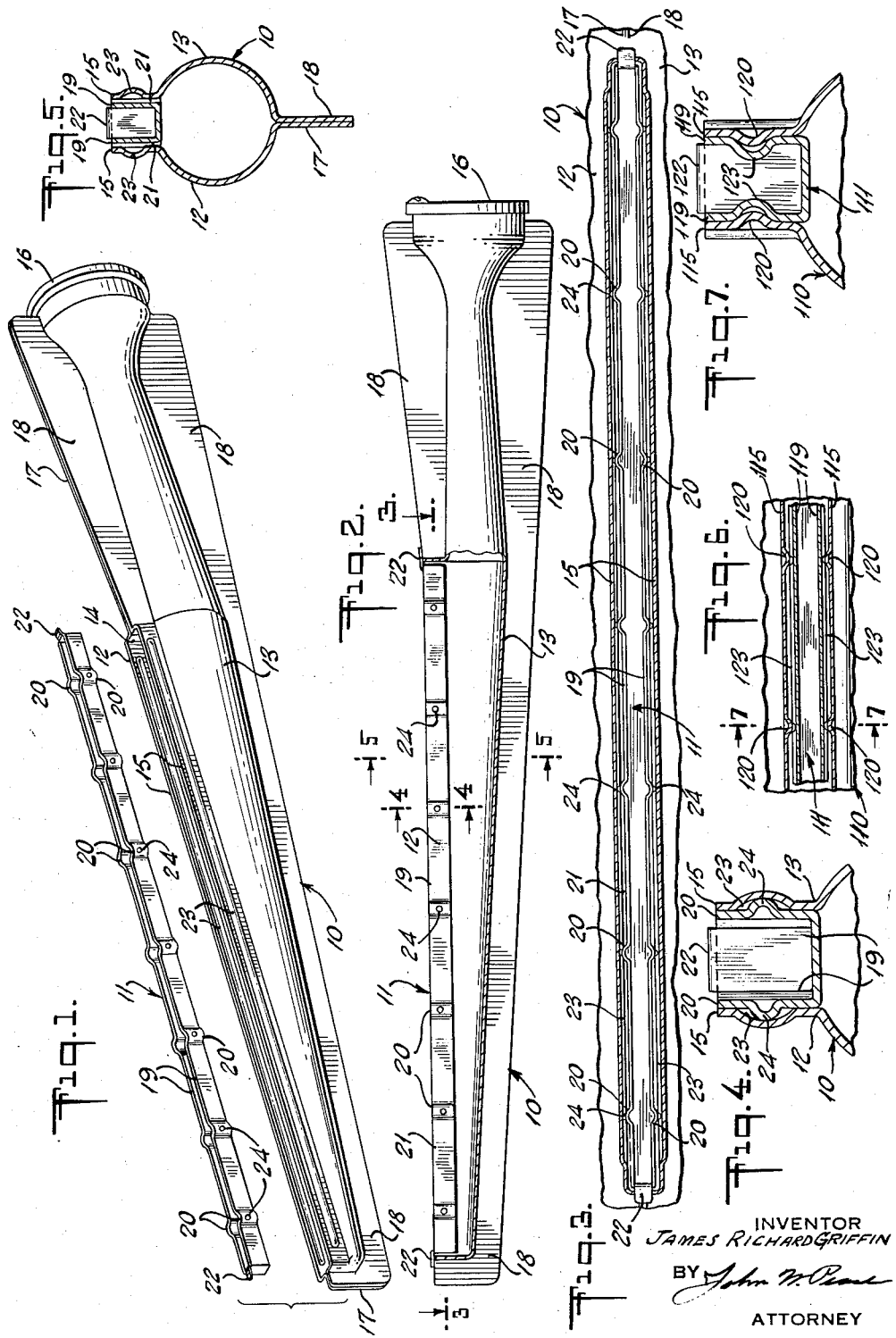

3,002,552
SHEET METAL GAS BURNER WITH REMOVABLE INSERT
James Richard Griffin, Louisville, Ky., assignor to American Radiator & Standard Sanitary Corporation, New York, N.Y., a corporation of Delaware
Filed Apr. 16, 1958, Ser. No. 728,979
2 Claims. (Cl. 158—116)

This invention relates to burners used in various types of gas-fired heating equipment, such as space heaters, control heating apparatus, ovens and similar equipment wherein combustible gas is employed as the heating medium.

Various types of burners are employed in such gas heating equipment. One conventional type consists of a housing forming a mixing chamber having an opening in which is positioned a stamped insert member adapted to provide a plurality of gas passages for passing gas from the mixing chamber to the exterior of the housing. In such arrangement the insert or inserts are held in position by permanently fixing the same to the mixing chamber sides or by removably fixing the inserts to the chamber sides by nuts and bolts, screws, clamps or other separate means. Such construction leaves room for improvement as to cost, operational characteristics, and service.

It is an object of my invention to provide a gas burner of an improved light weight, rugged construction and one which lends itself to inexpensive mass production methods.

A further object is to provide a gas burner having an integral insert member readily secured to and removable from the mixing chamber without separate securing means.

A still further object is to provide a gas burner having a removable insert and a mixing chamber with portions formed to cooperate each with the other in securing the insert in the chamber for ready removal of the insert.

Another object is to provide a gas burner having a mixing chamber, an elongated insert removably fixed in an opening of the mixing chamber and tabs at the extremities of the insert for the dual purpose of removing the insert and preventing flash-back in the mixing chamber.

Further objects of my invention will appear in the following specification and the drawings, which are intended for the purpose of illustration only, and in which:

FIG. 1 is a perspective disassembled view of a housing and insert constituting an elongated gas burner constructed in accordance with the invention;

FIG. 2 is a side elevation of the gas burner, a portion of the housing being broken away to show the assembled insert;

FIG. 3 is a detail plan view of the burner showing the housing in section on the line 3—3 of FIG. 2;

FIG. 4 is a sectional view taken on line 4—4 of FIG. 2;

FIG. 5 is a sectional view taken on line 5—5 of FIG. 2;

FIG. 6 is a plan view in section of a portion of a burner showing a modification of my invention; and FIG. 7 is a sectional view taken on line 7—7 of FIG. 6.

Referring to FIGS. 1 to 5 of the drawings, my improved burner comprises a mixing tube or housing 10 and an insert 11. The mixing tube 10 comprises two mating plates 12 and 13 formed to provide a hollow elongated interior of substantially circular varying cross-section; an elongated rectangular opening 14 formed by outwardly projecting parallel flange or rib portions forming side walls 15 from the material adjacent the opening and an apertured cover plate 16 through which gas is admitted to the mixing tube. The two halves of the mixing tube are secured together by welding along flat engaged complementary flange portions indicated at 17 and 18 to form gas tight joints.

The insert element 11 is U-shaped in cross-section and of a length to fit within the rectangular opening 14 with its side walls 19 parallel to but spaced slightly from the ribs 15 of the mixing tube 10 as best seen in FIGS. 3 and 5. Such spacing may be accomplished by providing spaced crimps or outwardly bent vertical wall portions 20 on the side walls 19 of the insert 11 whereby individual separated outlet gas passages 21 are formed on opposite sides of the insert 11 and between the crimps 20.

The length of the insert 11 is made slightly short of the length of the rectangular opening 14 to allow gaps for expansion and contraction of the insert 11 responsive to temperature changes. At the top of the end walls of the insert 11, I provide outwardly disposed tabs 22 which extend beyond the ends of the opening 14 and overlap the adjoining portion of the mixing tube 12—13. The tabs serve the dual purpose of providing means for lifting the insert out of the mixing tube and preventing flash-back into the mixing tube by overlapping and closing the clearance space or gap between the end of the insert and the adjacent portion of the tube.

To lock the insert in place within the ribs 15 of the mixing tube, I form in the ribs 15 grooves 23 spaced from the top edge of the ribs 15 as best seen in FIGS. 4 and 5. A projection 24 is formed on each of the crimps 20, forming in combination with the grooves 23 detent means for locking the insert in place. The tabs 22 also form stop means such that when the insert is forced downwardly until the tabs 22 engage the burner tube the detent means 23—24 is in locked or snapped-in position as shown in FIG. 4. The side walls or ribs 15 and the insert walls 19 have sufficient flexibility and resilience to permit the detent means 23—24 to be readily engaged or disengaged.

Thus, to insert and lock in position the insert member 11 for ready manual removal, no separate securing means is required. Also each of the three pieces forming the burner, that is, the housing halves 12 and 13 and the insert member 11, are readily formed by a simple stamping operation.

As a modification, it should be noted that the crimps could be formed in the ribs 15 and the grooves in the insert member 11 if desired, as shown in FIGS. 6 and 7 at 120 and 123.

It would also be possible to enlarge the projection 24 to locate, lock and space the insert in the burner, thus eliminating the crimps 23 and leaving the side walls or ribs 15 straight.

While my improved gas burner and burner element have been herein shown and described as embodied in several preferred forms of construction by way of example, it is to be understood that various changes and modifications may be made therein without departing from the spirit of the invention, and I, therefore, reserve the right to all such changes as properly fall within the scope of the appended claims.

I claim:

1. A gaseous burner comprising a hollow sheet metal body of generally tubular form having an opening in the side, the material adjacent the edges of said opening being turned outwardly to form end walls and a pair of spaced parallel resilient side walls; an insert having a U-shaped cross-section, end walls, and a second pair of parallel resilient side walls, said opening being of a size to accommodate said insert within the walls thereof, one of said pairs of parallel walls being formed with spaced crimps extending outwardly from said opening and engageable with adjacent portions of said other pair of parallel walls to form spaced separate gas passages between said insert and said body; projections on said crimps; said other pair of parallel walls being formed with grooves generally parallel to the body axis and adapted to accommodate said projections and removably lock said insert in position between said other walls, said insert being shorter than said opening to provide end clearance spaces for thermal expansion and tab means formed on at least one end wall of said insert and positioned to extend outwardly from said wall to overlap the adjacent end wall of said opening to close the clearance space and thereby prevent flash back through said opening, said tab extension being of such length as to provide a gripping means for removing the insert.

2. A burner for gaseous fuel consisting of a sheet metal, hollow body member having an elongated outlet opening, a set of integral side walls and end walls bordering and extending outwardly from said opening, a one-piece, sheet metal insert member having a bottom and having a set of side walls each spaced from one of said first side walls by a gap forming an elongated narrow fuel passage, and having end walls each spaced from one of said first end walls by a gap wider than said fuel passages for expansion clearance, integral projections on one set of side walls engaging the confronting surfaces of the other set to maintain said fuel passage spacing, a longitudinal groove in each of the walls of the other set, means on and extending outwardly beyond said projections receivable in said grooves to hold the parts assembled while permitting relative longitudinal expansion of the body member and the insert member, and integral tab means extending longitudinally from said insert end walls over and beyond the outlet opening end walls at all times to close said end wall gaps against gas flow and to provide lifting tabs for removing the insert.

References Cited in the file of this patent
UNITED STATES PATENTS

| | | |
|---|---|---|
| 1,571,636 | Nieberding | Feb. 2, 1926 |
| 2,470,880 | Zimbelman et al. | May 24, 1949 |
| 2,607,405 | Weinandy | Aug. 19, 1952 |
| 2,652,107 | Hughes | Sept. 15, 1953 |

FOREIGN PATENTS

| | | |
|---|---|---|
| 7,540 | Switzerland | Mar. 18, 1896 |